United States Patent [19]

Gammie et al.

[11] Patent Number: 5,270,809

[45] Date of Patent: Dec. 14, 1993

[54] DATA RETURN FOR A TELEVISION TRANSMISSION SYSTEM

[75] Inventors: Keith Gammie; Wayne Sheldrick; Arthur Woo, all of Ontario; Cameron Bates, Toronto, all of Canada

[73] Assignee: Scientific-Atlanta, Atlanta, Ga.

[21] Appl. No.: 677,689

[22] Filed: Mar. 29, 1991

[51] Int. Cl.⁵ .............................................. H04N 07/00
[52] U.S. Cl. ......................................... 358/84; 455/2; 379/92
[58] Field of Search .................... 455/2, 4.1, 4.2, 5.1, 455/6.1; 358/84, 86; 370/95.2; 379/92

[56] References Cited

U.S. PATENT DOCUMENTS

| | | |
|---|---|---|
| 3,777,278 | 12/1973 | Majeau et al. |
| 3,878,322 | 4/1975 | Sullivan . |
| 3,878,512 | 4/1975 | Kobayashi et al. |
| 3,944,742 | 3/1976 | Cunningham . |
| 4,063,220 | 12/1977 | Metcalfe et al. |
| 4,071,908 | 1/1978 | Brophy et al. |
| 4,104,486 | 8/1978 | Martin et al. |
| 4,241,237 | 12/1980 | Paraskevakos et al. |
| 4,241,410 | 12/1980 | DePuy . |
| 4,325,078 | 4/1982 | Seaton et al. |
| 4,361,851 | 11/1982 | Asip et al. |
| 4,365,145 | 12/1982 | Frentress . |
| 4,409,592 | 10/1983 | Hunt . |
| 4,455,453 | 6/1984 | Paraskevakos et al. |
| 4,528,663 | 7/1985 | Citta . |
| 4,536,791 | 8/1985 | Campbell et al. |
| 4,546,382 | 10/1985 | McKenna et al. |
| 4,558,464 | 12/1985 | O'Brien, Jr. |
| 4,893,248 | 1/1990 | Pitts ............................... 358/84 |
| 5,012,510 | 4/1991 | Schaubs .......................... 379/92 |
| 5,157,716 | 10/1992 | Naddor et al. .................. 379/92 |

*Primary Examiner*—Reinhard J. Eisenzopf
*Assistant Examiner*—Philip J. Sobutka
*Attorney, Agent, or Firm*—Banner, Birch, McKie & Beckett

[57] ABSTRACT

A method for transmitting information over a communication network between a population of remote terminals and a central location having a capacity of simultaneously communicating with a predetermined number of remote terminals in the population. A first time period is fixed during which every remote terminal may initiate one attempt to communicate with the central location over the communication network. Respective times within the first time period are established at which each of the remote terminals will initiate its attempt to communicate with the central location. A number of the remote terminals which successfully communicate with the central location to transmit information therebetween is monitored. The first time period is then decreased to a second time period if the number of remote terminals which successfully communicate with the central location is less than the capacity of the central location. Respective times within the second time period are then established at which remote terminals which have not initiated their respective attempts to communicate with the central location will initiate their attempts to communicate with the central location. The above steps are repeated to establish a time period at which the number of remote terminals which communicate with the central location is approximately equal to the capacity of the central location. The time period thus set is maintained until each of the remote terminals has initiated its attempt to communicate with the central location.

15 Claims, 6 Drawing Sheets

DATA RETURN FOR A TELEVISION TRANSMISSION SYSTEM

BACKGROUND OF THE INVENTION

1. Field of the Invention

The present invention generally relates to a method and a system for establishing communication between a plurality of remote units and a central location in a television transmission system and, more particularly, to a method and apparatus for transferring information such as billing information and viewing statistics from decoder units to a central location in a satellite television transmission system.

2. Description of the Relevant Art

For the purposes of the following discussion and this invention, the term "subscriber" means one who receives a television service. The "subscriber" could thus be an individual consumer with a decoder in his own home, or could be a system operator such as a local cable TV operator, or a small network operator such as a hotel/motel operator with a central decoder for all televisions in the hotel or motel. In addition, the "subscriber" could be an industrial user, as described in U.S. Pat. No. 4,866,770 assigned to the same assignee as the present application and incorporated herein by reference.

For the purposes of this invention, a network is defined as a program source (such as a pay television provider), an encoder (sometimes called a "head end"), a transmission means (satellite, cable, radio wave, etc.) and a series of decoders used by the subscribers. A system is defined as a program source, an encoder, a transmission means, and a single receiving decoder. The system model is used to describe how an individual decoder in a network interacts with the encoder.

Figure 1:
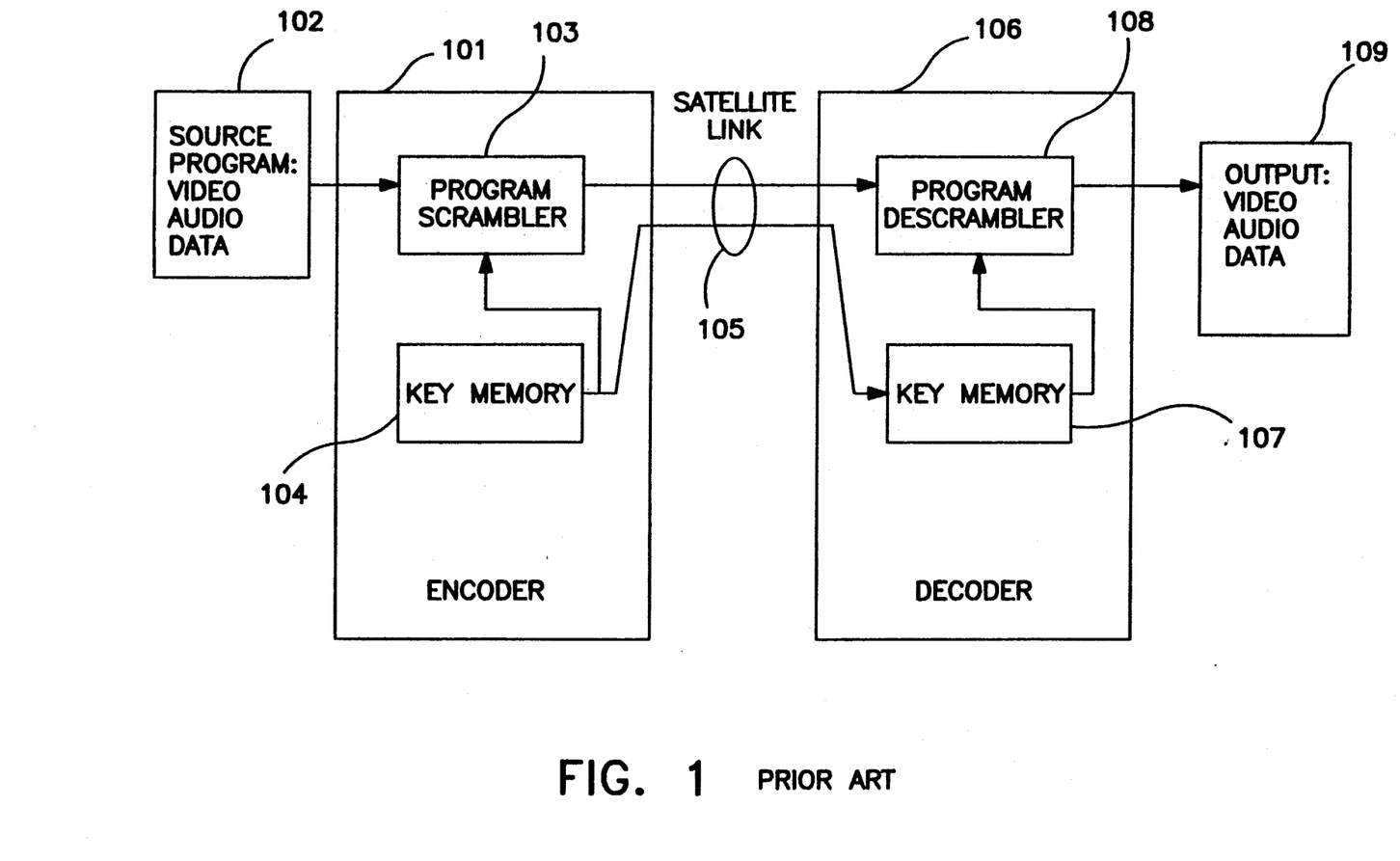
FIG. 1 is block diagram of a prior art satellite television system.

FIG. 1 shows a prior art conditional-access system for satellite transmission. In encoder 101, the source program information 102 which comprises video signals, audio signals, and data is scrambled in program scrambler 103 using a key from key memory 104. The scrambling techniques used may be any such techniques which are well known in the art. The key can be a signal or code number used in the scrambling process which is also required to "unlock" or descramble the program in program descrambler 108 in decoder 106. In practice, one key can be used (single layer encryption) or more than one key (not shown). The key is usually changed with time (i.e.—monthly) to discourage piracy. The scrambled programs and the key are transmitted through satellite link 105, and received by conditional-access decoder 106. Decoder 106 recovers the key from the received signal, stores it in key memory 107 and applies it to program descrambler 108 which descrambles the scrambled program received over satellite link 105, and outputs unscrambled program 109.

Specific details of the features of a prior art conditional access system may be found in commonly assigned U.S. Pat. No. 4,890,319, incorporated herein by reference.

Such a system may allow for pay-per-view (PPV) and/or impulse pay-per-view (IPPV) programming. Pay-per-view programming is defined here as any programming where the subscriber can request authorization to watch a particular program. In many pay television systems, pay-per-view programming is used for sporting events (boxing, wrestling, etc.) or concerts which are not transmitted on a regular basis. A subscriber wishing to view the event must receive authorization in the form of a special descrambler mechanism, or in the form of a special code transmitted or input to the subscriber's decoder. A subscriber may, for example, receive authorization by telephoning a representative of the system operator who authorizes the subscriber by transmitting the special code to the subscriber's decoder.

Impulse pay-per-view programming is one type of pay-per-view programming. Impulse pay-per-view is a particularly attractive feature since it allows a subscriber to authorize his or her decoder to view pay-per-view programming without requiring the immediate intervention of the system operator. For example, the subscriber may control his decoder to permit viewing of a particular program by means of keypad sequence for effecting authorization. Billing information including, for example, a program ID and the time and date of purchase, is then stored in non-volatile memory of the decoder. Periodically, this billing information is transferred, for example over the public switched telephone network, to a billing computer of the system operator. The subscriber is then billed on a regular basis, e.g. monthly, for his or her purchases.

Since the billing information represents revenue to the system operator, it is important that this information be transferred in an efficient manner over a reasonable time period. The prior art contains a number of techniques for controlling the transfer of data from a plurality of remote terminals to a central location.

U.S. Pat. Nos. 4,241,237 and 4,455,453 to Paraskevakos et al. disclose remote meter reading systems where each of a number of remote units initiate callback at predetermined intervals to a central facility for billing and monitoring purposes. A central complex provides a digital instruction to each remote unit upon the completion of its data transfer. The instruction includes data to control the next scheduled callback time.

U.S. Pat. No. 4,584,602 to Nakagawa discloses a data collecting system and method which are capable of collecting television audience rating data. A marker signal initiates the callback and after waiting a predetermined time necessary for other terminal units to transmit their data, each terminal unit automatically dials a predetermined telephone number in order to transmit requested viewing data.

U.S. Pat. No. 4,696,029 to Cohen controls the initiation of voting calls through regulation of the visual stimuli which trigger the calls. A control center monitors polling call traffic at a plurality of central offices until it determines that the traffic being generated has reached a level which is not within the traffic-handling capability of the central office switching machines. The control center then sends messages which cause character generators at local affiliates to reduce the frequency and/or duration of the visual stimuli until the traffic generated has dropped to a level which is within the traffic handling capabilities of the central office.

U.S. Pat. No. 4,528,663 to Citta discloses a subscriber upstream communication technique for use in two-way CATV system. In accordance with the technique, the transmission window size is initially increased until a maximum window length is achieved and then the window size is decreased in response to a selected number of further transmission attempts. The transmission window is decreasing in size following the peak load to enhance the overall speed of the system.

PCT 89/10670 of Naddor et al., assigned to the assignee of the present application, discloses a callback technique in which a callback period is dynamically adjusted to promote efficient use of the telephone network. An initial guess is made to determine an initial callback period. Based on the number of calls received at the cable television headend, the length of the callback period is dynamically increased and/or decreased to control the callback rate.

While these and other systems are effective to varying degrees, they become less effective where the decoders are part of television systems servicing large geographical areas, e.g., the United States. For example, a satellite television system may include up to two million decoders. The need remains for a technique for establishing communication with such decoders in an efficient manner to, for example, gather billing information therefrom.

SUMMARY OF THE INVENTION

Accordingly, it is an object of the present invention to provide a method for transferring information between a plurality of remote terminals disposed over a large geographic area and a central location.

It is another object of the present invention to provide a method of recovering billing information in an impulse pay-per-view satellite system.

In accordance with the present invention, a method for transmitting information over a communication network between a population of remote terminals and a central location having a capacity of simultaneously communicating with a predetermined number of remote terminals in the population is provided. A first time period is fixed during which every remote terminal could initiate one attempt to communicate with the central location over the communication network. Respective times within the first time period are established at which each of the remote terminals initiates its attempt to communicate with the central location. A number of the remote terminals which successfully communicate with the central location to transmit information therebetween is monitored. The first time period is then decreased to a second time period if the number of remote terminals which successfully communicate with the central location is less than the capacity of the central location. Respective times within the second time period then established at which remote terminals which have not initiated their respective attempts to communicate with the central location will initiate their attempts to communicate with the central location. The above steps are repeated to establish a time period at which the number of remote terminals which communicate with the central location is approximately equal to the capacity of the central location. The time period thus set is maintained until each of the remote terminals has initiated its attempt to communicate with the central location.

Also in accordance with the present invention, apparatus for controlling a transmission of information over a communication network between a population of remote terminals and a central location having a capacity of simultaneously communicating with a predetermined number of remote terminals in the population is provided. The apparatus includes means for fixing a first time period during which every remote terminal could initiate one attempt to communicate with the central location over the communication network. A monitor monitors a number of remote terminals which successfully communicate with the central location to transmit information therebetween. Means responsive to the monitoring means discretely decreases the first time period until the number of remote terminals which successfully communicate with the central location is approximately equal to the capacity of the central location. Means responsive to the means for decreasing instructs the remote terminals which have not initiated their attempt to communicate with the central location to establish respective times within the discrete time periods fixed by the means for decreasing at which the remote terminals initiate their attempts to communicate with the central location.

Finally, in accordance with the present invention, apparatus for transferring information over a communication network to a central location is provided. The apparatus includes a receiver for receiving instructions from the central location. The instructions include instructions for initiating attempts to transfer information to the central location in accordance with a transmission window and a transmission sequence. Means responsive to the instructions establish a first time within the transmission window at which the apparatus could initiate an attempt to communicate with the central location. A transmitter transmits the information over the communication network if the apparatus successfully communicates with the central location. Means responsive to the instructions establish a second time within the first transmission window at which the apparatus initiates an attempt to communicate with the central location if the apparatus has not attempted to initiate communication with the central location and an end time of the first transmission window is changed.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

The present invention is described below in terms of a B-MAC satellite television system. Although a B-MAC system is specifically described, the invention may be applied to other MAC systems such as C-MAC, D-MAC, and D/2-MAC. The invention may also be implemented in NTSC (National Television Standards Committee), PAL, SECAM, or high definition television systems. The present invention is broadly applicable to systems for establishing communication over a communication network between a central location and a plurality of remote units, particularly remote units distributed over a large geographical area.

Figure 2:
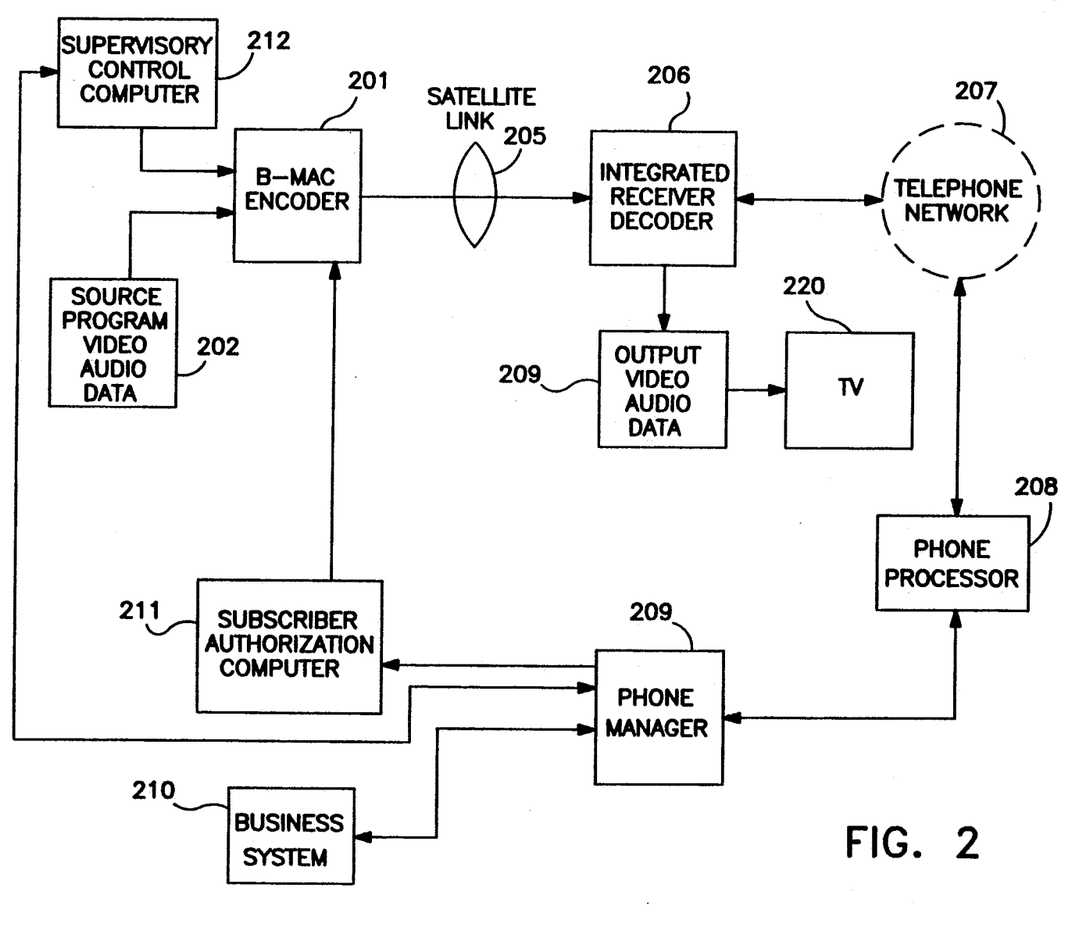
FIG. 2 is a block diagram of a satellite television system in which the present invention may be implemented.

A B-MAC satellite television system in which the present invention may be implemented is shown in block form in FIG. 2. B-MAC encoder 201 encodes a source program 202 for transmission over a satellite link 205 to an integrated receiver-decoder (IRD) 206. Program source 202 may include video, audio, and data information. The source program information is scrambled in a program scrambler of B-MAC encoder 201 using a key (as discussed above). The scrambled programs and key are transmitted through satellite link 205. IRD 206 receives the scrambled programs and key. The key is recovered from the received signal, stored in a key memory and applied to a program descrambler which descrambles the scrambled program and outputs unscrambled program 209 for display on television 220.

IRD 206 is coupled to public switched telephone network 207. The telephone network is coupled to a phone processor 208 for receiving calls initiated by the IRDs in the network. The phone processor may comprise, for example, a Scientific Atlanta Model 8554-001 Phone Processor, available from the assignee of the present application. A current implementation utilizes eight model 8554-001 processors to handle incoming calls. A phone manager computer 209 such as a Compaq SystemPro controls phone processor 208.

Phone manager computer 209 is coupled to business system computer 210 for compiling and processing billing information to bill subscribers. Phone manager 209 is also coupled to a subscriber authorization computer (SAC) 211 which controls, for example, the authorization of subscribers to receive particular programming. Subscriber authorization computer 211 contains information such as program tiers for a current month, credit limits, service tiers, call-in billing group, call-in time zone, call-in phone number, and store and forward disable for decoders in the network. Subscriber authorization computer 211 is coupled to B-MAC encoder 201 to permit communication between computer 211 and the IRDs in the network over satellite link 205. Finally, a system supervisory control computer 212 coupled to phone manager 209 and B-MAC encoder 201 controls the overall operation of the system.

Data or commands are transmitted to decoders in the network over satellite link 205 in at least two ways. In a first way, system data generated by supervisory control computer 212 carries program specific data for the channel currently tuned by a decoder. In a second way, addressed data packets (ADPs) are used to deliver decoder specific information to a single decoder. Each decoder in the network is assigned a unique user address and a matching secret serial number (SSN). When an addressed packet with an address matching the user address of a decoder is received, the packet is decrypted with the SSN. The packets preferably include a checksum which is used to verify both correct reception and decryption with a matching SSN. Typically, system data originates from supervisory control computer 212 as noted, while addressed data packets originate from subscriber authorization computer 211, although the invention is not limited in this respect.

Figure 3:
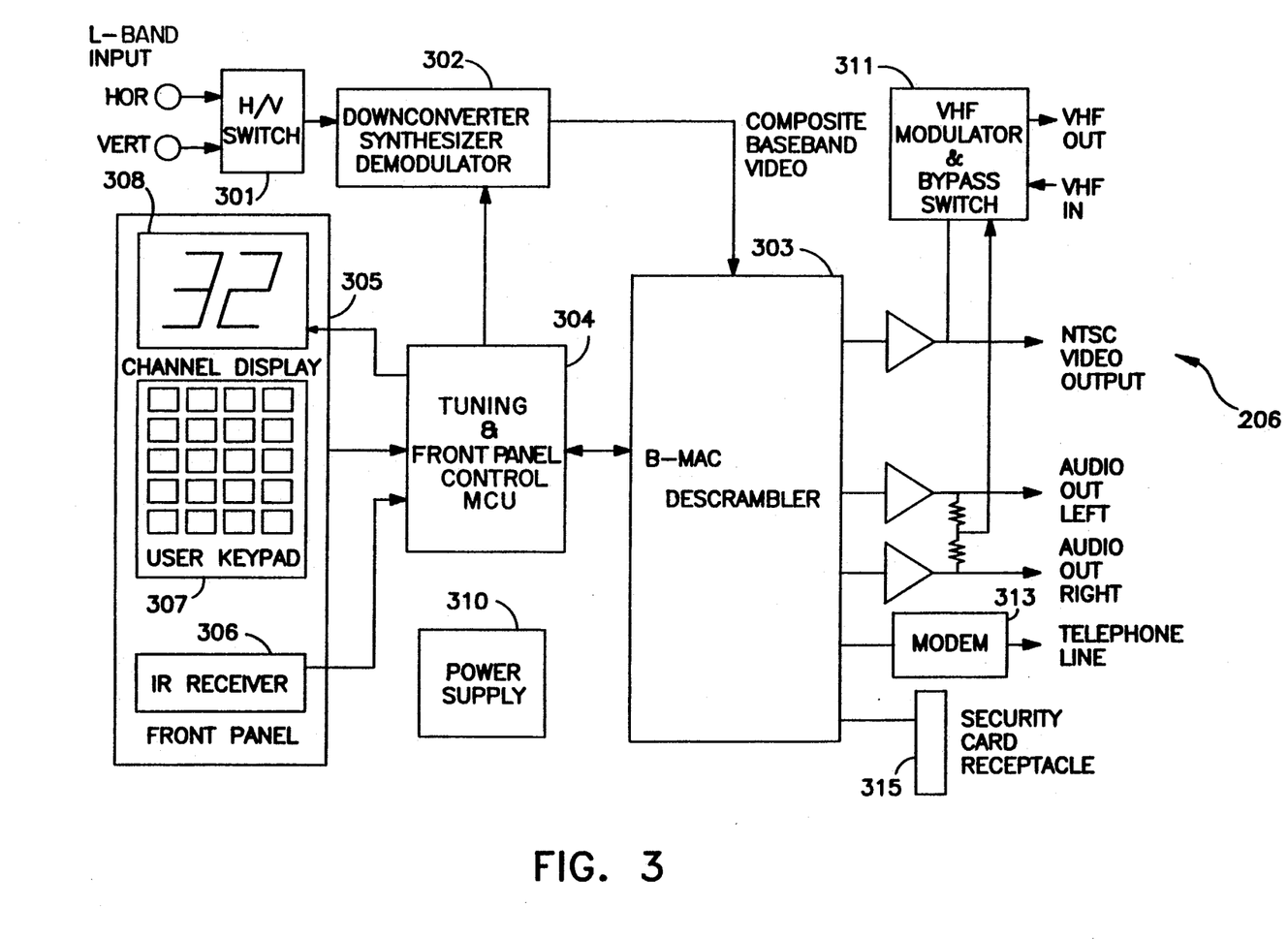
FIG. 3 is a block diagram of the integrated receiver decoder of FIG. 2.

FIG. 3 is a block diagram of B-MAC IRD 206 shown in FIG. 2. H/V switch 301 switches between the horizontal and vertical polarities of the incoming transmission over satellite link 205. The incoming signal then passes to block 302 including a downconverter, a tuner, and demodulator. The downconverter and tuner select a channel from the incoming signal and lower it to some intermediate frequency (IF). The tuner may, for example, comprise a synthesized tuner. The demodulator demodulates the signal to generate composite baseband video which is input into B-MAC decoder 303. Front panel 305 includes an IR receiver 306, user keypad 307, and LED display 308. IR receiver 306 is adapted to receive control signals from an associated IR remote control (not shown). User keypad 307 includes a plurality of keys 310 for permitting the subscriber to input, for example, channel selections and volume control. LED display 308 displays the tuned channel and may display other information such as time. Power supply 310 supplies power to IRD 206.

A tuning and front panel control processor 304 may comprise a MC68HC05C4 and tunes the transponder tuner in block 302, scans front panel keypad 307 and any remote keypads for keystrokes, drives LED display 308 and provides volume control. Keystroke interpretation is generally performed by display control processor (DCP) 405 (see FIG. 4), except for volume control, which is internal to tuning processor 304. Volume control keystrokes are passed to DCP 405, but function only to instruct DCP 405 to un-mute audio.

B-MAC decoder 303 decodes the composite baseband video input thereto and outputs NTSC video and audio as shown. VHF modulator 311 modulates the video and audio outputs of B-MAC decoder 303 for reception by television receiver 220 (FIG. 2). Modem 313 allows IRD 206 to interface with the public switched telephone network to permit communication between IRD 206 and a system operator. For example, billing information related to impulse pay-per-view purchases may be transferred to the system operator. Alternatively, information from the cable operator may be transferred to IRD 206 over the telephone network. B-MAC decoder 303 is also coupled to a security card receptacle 315 for receiving an insertable security card. A description of the insertable security card and its operation are described in commonly assigned copending application Ser. No. 07/677,460 filed Mar. 29, 1991 and entitled "Independent External Security Module For a Digitally Upgradeable Television Signal Decoder", which is incorporated herein by reference.

Figure 4:
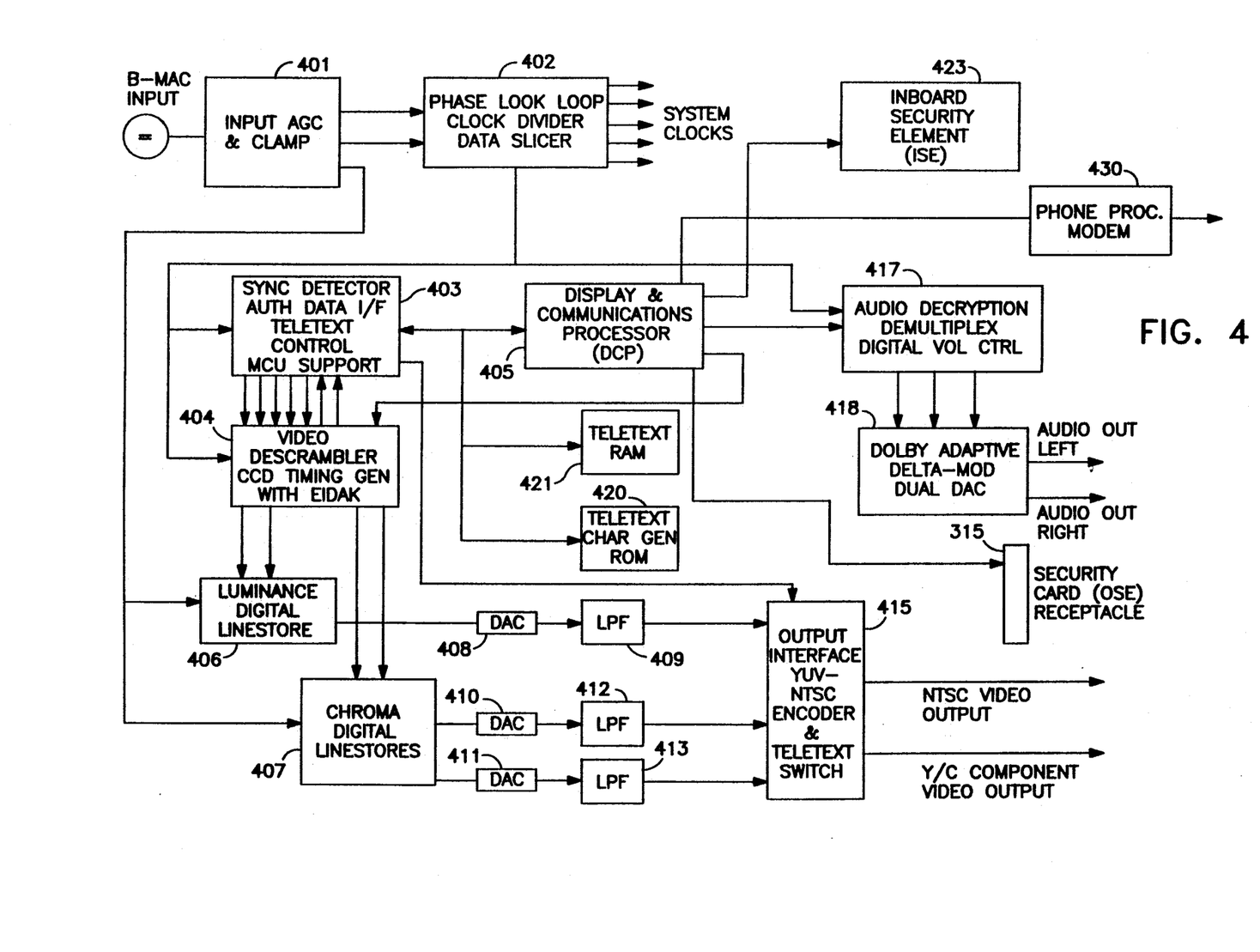
FIG. 4 is a block diagram of the descrambler shown in FIG. 3.

FIG. 4 is a detailed block diagram of B-MAC descrambler 303 of FIG. 3. The baseband B-MAC signal is input to AGC and clamping block 401 for performing well-known gain control and clamping operations. Block 402 includes a phase lock loop and a clock divider for generating system clock signals used in decoder operation. Attention is directed to U.S. Pat. No. 4,652,903, assigned to the assignee of the present application and incorporated herein by reference, for a description of a technique of generating clock signals. Block 402 also includes a data slicer for providing data contained in the incoming signal to microprocessor and teletext support interface (MATS) 403 and video descrambler 404. MATS 403 performs data error correction and data formatting on both incoming system data and addressed data packets and supplies the corrected and formatted data to display and communications processor (DCP) 405. DCP 405 may comprise a MC68HC11E9 and performs overall control of the other processors of decoder 303 and of all user interfaces.

The luminance and chrominance signals of the B-MAC signal are respectively provided to luminance digital linestore 406 and chrominance digital linestore 407. The decompressed luminance signal is provided to digital-to-analog converter 408 and then to low pass filter 409, where it is filtered. The analog luminance signal then goes to output interface 415. The sampling signals necessary to decompress luminance are produced by a timing generator in block 404 and supplied to luminance digital linestore 406 by clock drivers.

The chrominance signal is decompressed in digital chrominance store 407. Separate outputs are provided for the two color difference signals, which are passed through respective digital-to-analog converters 410 and 411. The color difference signals are then respectively passed through low pass filters 412 and 413, where they are filtered. The filtered signals are provided to output interface 415. The necessary sampling signals are supplied to chrominance store 407 from a timing generator in block 404 through clock drivers. Audio information is provided to block 417 including an audio decryptor, a demultiplexor and a digital volume control. The audio information then passes to block 418 including a Dolby ® adaptor, a delta modulator, and a digital-to-analog converter. Teletext character generator ROM 420 and teletext RAM 421 are coupled to DCP 405 and MATS 407 for providing teletext characters to output interface 415 in accordance with teletext information contained in the incoming B-MAC signal. Output interface 415 outputs a standard NTSC video output. DCP 405 is also coupled to inboard security element (ISE) 423 and receptacle 315 for receiving an outboard security element (OSE). The ISE and OSE and their operation are discussed in detail in the above-identified copending application Ser. No. 07/677,460. Generally, only one of the ISE or OSE is active at a given time. Finally, DCP 405 is coupled to a phone processor 430 for interfacing the decoder and the public switched telephone network. Phone processor 430 may comprise a MC68HC05C4 and controls modem communication and tone generation. Since the modem transfers billing information representing revenue to the cable operator, telephone communications are preferably encrypted for security. The encryption takes place in one of ISE 423 or the OSE processors (whichever is active) before being passed to the modem. If the modem is utilized to receive information, such information is passed on verbatim to ISE 423 or the OSE. The active security element may initiate a call when commanded by system data or by an addressed data packet. The inactive security element may initiate a call only when commanded by an addressed data packet.

Figure 5:
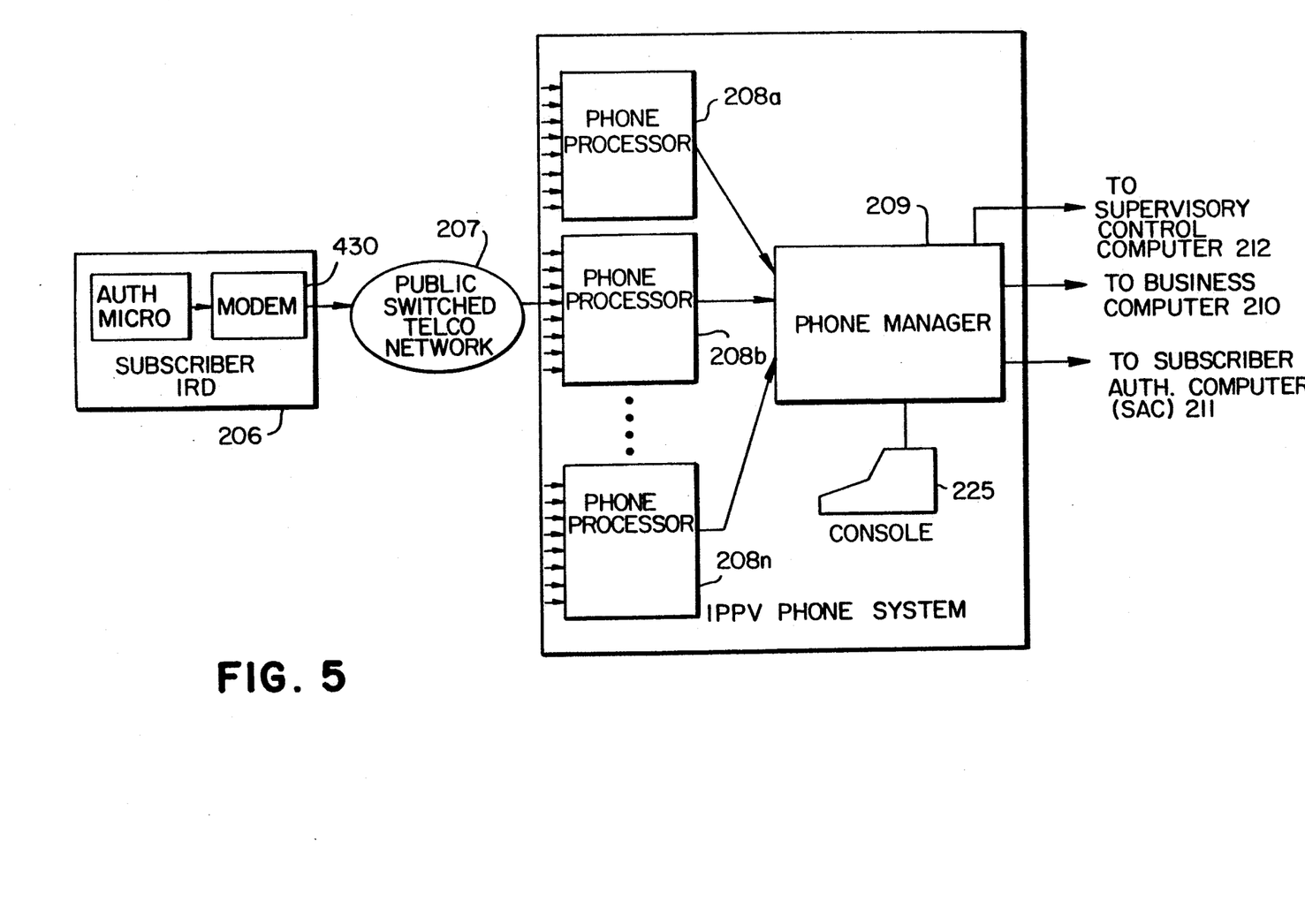
FIG. 5 illustrates in greater detail the system components for transferring data.

FIG. 5 illustrates in greater detail the components used to transfer data from subscriber IRD 206 to phone manager 209. The active processor (either ISE 423 or the OSE) initiates a phone call via modem 313 over public switched telephone network 207. Phone processors 208a, 208b, . . . 208n are provided to receive phone calls from the subscriber IRDs in the network. Phone processors 208a, 208b, . . . 208n are coupled to phone manager 209. A console 225 is coupled to phone manager 209 for permitting operator access to phone manager computer 209. Phone manager 209 is coupled both to business system computer 210 and subscriber authorization computer (SAC) 211.

Phone manager 209 serves as a front end processor for business computer 210. Phone manager 209 requests decoders to call in via their telephone links and collects the information provided by each decoder. Phone manager 209 normally instructs system supervisory control computer 212 to generate system data which commands large portions of the population of decoders to call in as described below. If a decoder does not call in when commanded by the above method, it is explicitly addressed and commanded to call in. If it persistently fails to call in, it is considered non-responding. The data transferred from the IRDs in the network is stored in real time in non-volatile memory of phone manager 209 and is available to be uploaded to the business computer 210 at any time. Business computer 210 controls phone processor 209 and sends commands to control the next function to be performed.

Specifically, phone manager 209 generates requests requesting that the IRDs in the network attempt to initiate communication over the telephone network. These "callbacks" may be initiated by (1) an internal callback scheduler of phone manager 209 e.g. biweekly, monthly; (2) requests from business computer 210; or (3) the phone manager operator console 225. The callback request is formatted and forwarded to subscriber authorization computer (SAC) 211 or system supervisory control 212 in accordance with the type of callback, i.e., either individual or group, respectively. A callback command is then sent, in the encrypted B-MAC data stream, to the IRDs.

An IRD responds to the request by attempting to establish communication with phone processor 209 as follows. The IRD engages the telephone line and checks for dial tone. The IRD then dials a telephone number retrieved from EEPROM associated with the active security element. The telephone number is previously transmitted to the IRD in an addressed data packet from the subscriber authorization computer. If a phone connection is established, the IRD sends a self-identification message to phone manager 209. The phone manager then sends an acknowledgment to the IRD, with a command to upload, for example, IPPV viewing data. The IRD then uploads its IPPV viewing data to the phone manager. The phone manager sends an acknowledgment to the IRD and the IRD clears its IPPV viewing data from non-volatile memory. The IRD then releases the phone line.

It is emphasized that the present invention is not limited to uploading data from a population of remote terminals to a central location, but may also be used to download data from a central location to a population of remote terminals or a subset thereof.

Decoder 206 preferably permits impulse pay-per-view purchases. A number of methods are known in the art which permit a subscriber to purchase an impulse pay-per-view event. Several methods will be briefly identified, although it will be recognized the invention is not limited in this respect. For example, a system operator may define a period of time known as a purchase window. This purchase window may begin at a first time, e.g. a half hour before the beginning of the event, and end at a second time, e.g. fifteen minutes after the event has begun. It will be apparent that different purchase windows may be implemented. At any time during the purchase window, a subscriber may push a "BUY" key on either the front panel of the IRD or on a remote control for transmitting a "BUY" signal to the IRD. The active security element then authorizes the video descrambler to descramble the event. Billing information including, for example, an event ID and a purchase time and date is generated and stored in non-volatile memory. Alternatively, a subscriber may also pre-purchase an impulse pay-per-view event by using either the front panel keypad or the remote control keypad to enter an event ID into non-volatile authorization memory. When the event is active and IRD 206 determines that the active event ID matches the event ID of the pre-purchased event, the active security element authorizes the descrambler to descramble the event. Further, the system operator may also implement a credit system in which credits are downloaded to each subscriber IRD. When a subscriber wishes to purchase an impulse pay-per-view event, the number of credits is checked. If there are sufficient credits, the event is authorized. If not, the event is not authorized. The subscriber is preferably informed via a text screen that the event may not be purchased since his credit is insufficient. When a credit system is used, the event ID and the purchase date may be stored in non-volatile memory so that the system operator can, for example, determine a buy rate for a particular event. Exemplary pay television system are disclosed, for example, in U.S. Pat. Nos. 4,484,217 and 4,163,254 to Block, incorporated herein by reference.

In the present system, as a subscriber purchases IPPV programs, billing information or purchase data such as event ID and purchase date and time is accumulated in a secure EEPROM memory of the active security element. The purchase data remains in memory until forwarded to the system operator through the telephone interface. As noted above, there are two call-in mechanisms, which may operate concurrently, used by phone manager 209 to recover the purchase data. The first mechanism is a group command and the second mechanism is an individual command. The group command uses system data generated by the supervisory control computer and sent over the global satellite channel to specify large groups of decoders which are to call in and transfer data. Individual commands direct particular decoders to call in by addressing them with addressed data packets. Since data such as billing information represents revenue to the system operator, it is important that such information be collected quickly and efficiently.

Several definitions are presented for the discussion below. Call-in class is defined as a set of all decoders which satisfy conditions specified in a call-in command in system data. A call-in window is defined as a period of time during which every decoder in a call-in class will initiate a single phone call to the phone processor. A sequence is defined as a plurality or succession of call-in windows. A call-in window starts when a sequence number is changed. Preferably, a window starts when the sequence number is incremented by one. A call-in group is defined as a set of decoders which initiate calling on a particular clock-tick after the start of a call-in window. The length of each clock-tick is 64/60 seconds in a preferred embodiment, although the invention is not limited in this respect. The window end time is a sixteen bit number transmitted in system data which indicates when a current window is scheduled to end. The window end time is relative to the time when the window timer is equal to zero.

The number of clock ticks in any call-in window is given by

Window=(Window End Time) in ticks.  (1)

Since a window end time is a sixteen bit number, a call-in window can assume values in a range from 0 to $2^{16}$ ticks or approximately 19 hours. A single group initiates calls on a clock tick and all groups call in within a call-in window. Thus, the number of groups per window is given by equation (1). In response to a call-in command, each decoder selects a group number randomly from the range of group numbers allowed. That is, the decoders generate respective times during the window and initiate calls at the times so generated. Preferably, the times generated by the decoders produce a uniform distribution of incoming calls to the phone processor. In a current embodiment, this is done in accordance with the following equation:

Group=(Rand*Window)/65536  (2)

where Rand is a random number from 0...65535. Rand is a sixteen bit random number. Preferably, the unit address is not used as Rand, since it is not expected to have a uniform distribution over the range 0...65535. Preferably, Rand is a psuedo random number and changes from one window to the next and when a window is resized in order that each new window have a uniform distribution of decoders calling in. This may be implemented, for example, by having a set of 32 random bits and choosing a different sixteen each time by doing a rotate.

Alternatively, a truly random number may be stored in EEPROM. The truly random number of, for example, sixteen bits may seed a random number generator which executes a predetermined number of loops to generate Rand. When a window is resized, the random number generates executes more loops to generate a new value of Rand. The random number generator may be reseeded when a new window is opened. It will be appreciated that other techniques of generating random numbers may be implemented and the present invention is not limited in this respect.

Figure 6:
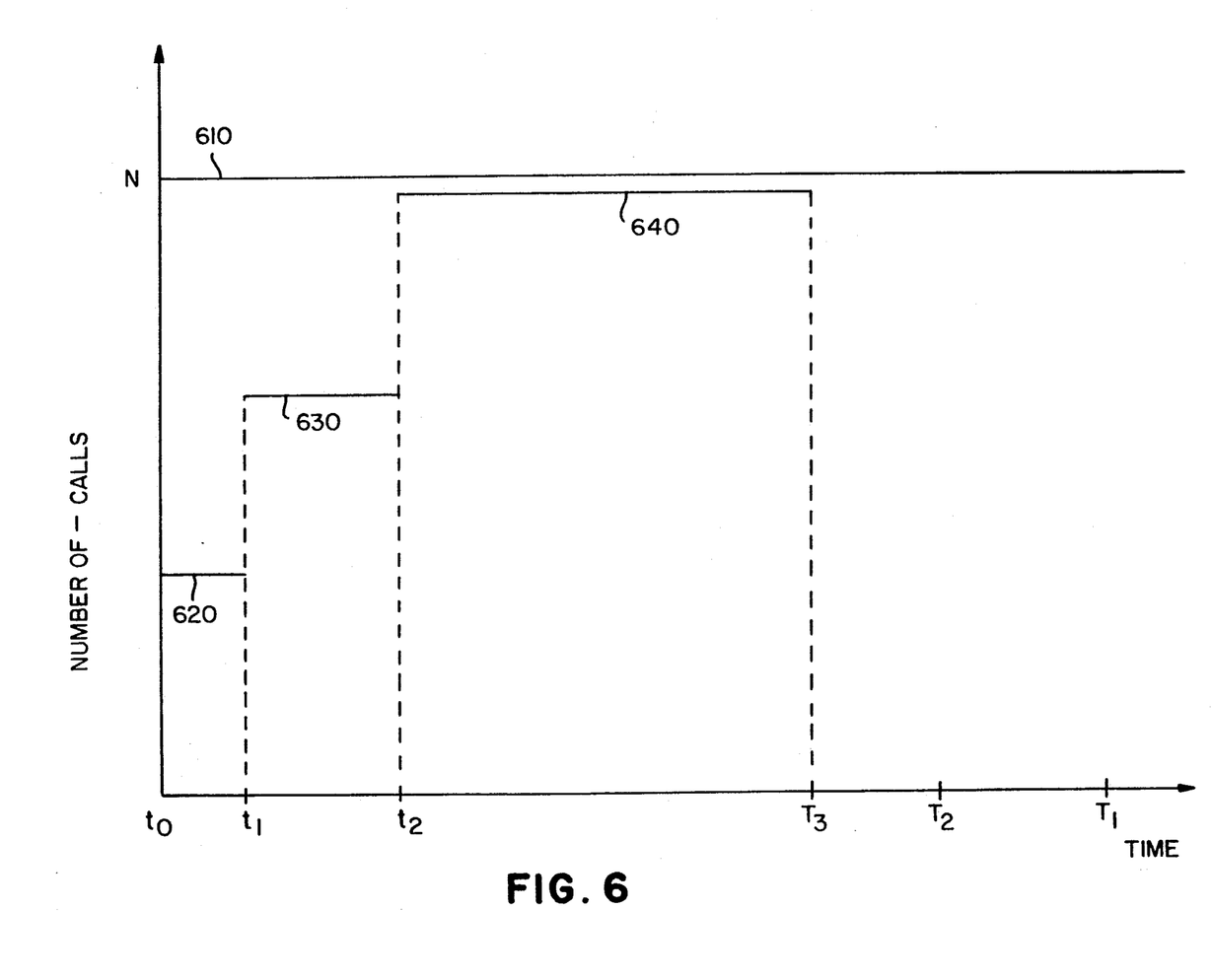
FIG. 6 is a graph illustrating the call-in technique of the invention.

In accordance with the invention, the window size is initially fixed to the maximum length, i.e., approximately 19 hours. The number of incoming calls to phone processors 208a, 208b, . . . 208n is monitored. Phone manager 209 is capable of simultaneously processing a predetermined number of calls N based on the number of phone processors and phone manager software. As the callback progresses, the number of incoming calls is monitored and the window is shrunk to generate a number of incoming calls from the decoders substantially equal to the number of calls capable of being simultaneously handled by phone processors 208a, 208b, . . . 208n and phone manager 209. This method is illustrated in the time line graph of FIG. 6. With reference to FIG. 6, the number of calls N capable of being simultaneously handled by phone processors 208a, 208b, . . . 208n and phone manager 209 is represented by line 610. With the window initially set at the maximum time period T1, the actual number of calls received by the phone processor during the time interval from $t_0$ to $t_1$ is shown by the line 620. $t_0$ is the initial window start time and $t_1$ is a time less than T1. Since line 620 indicates that the number of incoming calls is less than the number of calls capable of being processed, the window is shrunk to some time T2 less than T1. When this is done, the IRDs which have not yet attempted to call phone processor 209 then calculate a new callback time in accordance with the formula group=(random#X window end time)/65535  (3)

and the decoder callback timer is reset to zero. Preferably, the random number utilized in equation (3) changes whenever the window is resized. When this is carried out, it can be seen by reference to line 630 that the actual number of incoming calls during the time interval from $t_1$ to $t_2$ increases. Thus, the number of calls actually received by the phone processors is closer to the number of calls N capable of being simultaneously handled. By reducing the window still further to T3 and again calculating a new group for each of the IRDs which have not yet initiated an attempt to call in, it can be seen that the actual number of calls may be made approximately equal to the number of calls capable of being processed. Accordingly, the window size is maintained at T3 until time t is equal to T3 and the window ends.

When a call-in is requested through system data, the decoder first calls-in in accordance with the above method. If it gets a busy signal, or cannot complete the call, a "Retry" bit is set. Thus, when a retry window is opened by the system operator, all decoders with the retry bit set should call in. The retry bit should be cleared when a call-in is successful. If a decoder is scheduled to call in, but the window ends prematurely, the retry bit is not set.

When an addressed data packet is used to force a call-in, the decoder calls in as soon it receives and processes the command. If it gets a busy signal or cannot complete the call, the retry bit preferably remains set.

Thus, in real time, the window end time is changed, causing decoders to call in at a rate substantially equal to the rate of calls capable of being processed by the phone processor. For proper operation, it should be emphasized that the sequence number should not be changed until after the proper end time for the window.

An algorithm for the decoding implementing the above procedures is attached as an Appendix to this specification.

In order to effect enhanced control over the call-in, the present invention includes the following call-in modes:
(1) EVENT
(2) BUFFER
(3) RETRY
(4) STOP
In the EVENT mode, decoders which have purchased a particular event, characterized by an event ID, are commanded to call-in. In the BUFFER mode, decoders which have purchased a predetermined or threshold number of events are commanded to call-in. Thus, for example, decoders which have purchased five or more events may be commanded to call-in the BUFFER mode. In the RETRY mode, decoders which were unable to successfully call-in in a previous call-in window and have a retry bit set as described above are commanded to call-in. In the STOP mode, decoders in the population are commanded not to initiate attempts to call-in.

Each of these call-in modes includes several qualifiers for controlling which decoders actually attempt to call-in in a given mode. The first qualifier is a region code consisting of a time zone and a billing group which is recognized only in EVENT, BUFFER, and RETRY modes. In the United States for example, the time zone may be Eastern, Central, Mountain, or Pacific in accordance with the location at which a decoder is installed. The billing group is determined by the system operator and may, for example, be fixed in accordance with the day of the month on which a decoder was installed. Thus, in accordance with the region code, decoders in the Eastern Time Zone which were installed on the fifth day of the month may be commanded to call-in a given mode. The system may instruct decodes to ignore their billing groups by setting this qualifier to 0. Thus, by setting billing group to 0, decoders in a specified time zone may be commanded to call in. A second qualifier is a global bit which, when set in EVENT, BUFFER and RETRY modes, instructs the decoders to ignore time zone. Thus, by setting the global bit, decoders in any time zone which were installed on the fifth day of a month may be commanded to call-in in a given mode. In stop mode the global bit causes decoders to clear retry bit. A third qualifier is the sequence number which identifies a particular call-in window. As noted above, the sequence number is incremented each time a new window is opened. If a decoder has previously attempted to call-in during a window having a given sequence number, it will ignore subsequent call-in commands having the same sequence number. When a decoder is unable to call-in for any reason, it is a failed attempt and a retry bit is set in non-volatile memory. In the RETRY mode, only those decoders having the retry bit set will call-in. Finally, the window size is a qualifier which determines the length of the call-in period or window during which the decoders call-in.

Unlike the system described, for example, in PCT 89/10670, the decoders in the present invention will not retry unless explicitly instructed by the system operator. Further a wayward initial guess by the system operator as to the number of calls that will be generated by the call-in command resulting in short window would result in a large number of decoders being unable to get through. Since decoders do not retry in the present invention, those decoders which could not get through during the initial system overload would be lost for that window. Accordingly, in the present invention, it is important to start out with a large window and then shrink the window to generate the best utilization of the phone processor facilities. Any overloading of the system caused by a poor initial guess or shrinking the window too much or too quickly is to be avoided since those decoders which receive a busy signal or can't get through due to overloading must be commanded by an addressed data packet or system data in a RETRY mode to call-in, resulting in inefficient system operation. Since the population may consist of up to two million decoders, a failure of even a small percentage of decoders to transfer billing information can represent a significant revenue for the system operator.

Non-responding decoder detection is initiated during normal call-in modes. Every incoming call sets a "CALLED" flag in the phone manager database. After a predetermined time period such as a day, a batch process runs which is aware of all the decoders which should have called in since the last time the batch process ran. Each decoder in the database is examined to see whether it should be called in. If so, its CALLED flag is checked. If this is clear, the decoder has not called in and is placed on a forced call-in list. After each decoder in the database is examined, all CALLED flags in the database are then cleared.

At some subsequent time, a time period is set aside for forced mode operation. The forced call-in list is downloaded in the form of commands to the subscriber authorization computer 211. These commands are preferably spaced out in time in order to avoid overloading the system with calls. Every entry in the forced call-in list has a counter called the call-in fail counter. Every day before entering forced mode, this counter is incremented for each element in the list. This indicates that the record has spent another day on the list without a call coming in. When a call comes in, if the decoder is in the forced call-in list, it is removed from that list. Periodically, business computer 210 uploads from the phone manager database the records in the forced call-in list whose call in fail counters are above a certain level. This information may then be printed out to permit appropriate action to be taken by the system operator. These decoders will remain on the forced call-in list until the business computer sends a delete decoder or deactivate decoder command.

Although the present invention is particularly concerned with the collection of IPPV data from remote terminals, other data may also be collected in accordance with the above-described procedure. For example, viewing statistics regarding a subscriber's viewing habits may also be collected for processing.

All applications and patents referenced above are incorporated herein by the respective references thereto.

Although illustrative embodiments of the present invention have been described in detail with reference to the accompanying drawings, it is to be understood that the invention is not limited to those precise embodiments and that various changes and modifications may be effected therein by those in the art without departing from the scope and spirit of the invention.

APPENDIX

Decoder Algorithm

```
Power Up
If not tried to call {
    increment retries
    tried to call = yes
{
Repeat forever {
    if new window {
        store sequence #
        if decoder part of call-in window {
            tried to call = no
            call waiting = yes
        }
    }
    if (new window or new end window time) and call waiting {
        get a random #R (0 . . . 65535)
        group = (R × window end time) / 65535
        timer = 0
    }
}
for every tick {
    if group <timer and call waiting {
        call — waiting = no
        call — dialled = yes
        initiate call-in
        tried to call = yes
    }
}
for every phone micro packet }
    if call dialled {
        if phone data request packet {
            get data and place in response buffer
            if response = hang up
                clear retries
        }
    }
    if phone poll packet {
        send response buffer
        if response = hang up {
            call — dialled = no
        }
    }
}
```

We claim:

1. A method for transmitting information over a communication network between a population of remote terminals and a central location having a capacity of simultaneously communicating with a predetermined number of remote terminals in said population, the method comprising the steps of:

(A) fixing a sequence of at least two call-in windows each having an initial maximum length, a first call-in window defining a time period during which each remote terminal in said population of remote terminals will initiate a single attempt to communicate with said central location over said communication network and a second call-in window defining a time period during which remote terminals which were unsuccessful in their attempt to communicate with said central location during the first call-in window will initiate another single attempt to communicate with said central location over said communication network;

(B) prompting said remote terminals to establish respective times within the first call-in window at which each of said remote terminals in said population of remote terminals will initiate its attempt to communicate with said central location;

(C) monitoring a number of said remote terminals which simultaneously communicate with said central location to transmit information therebetween during the first call-in window;

(D) varying the length of the first call-in window if the number of remote terminals which simultaneously communicate with said central location is less than the capacity of said central location, wherein the length of the first call-in period is varied so as to be decreased, but not increased;

(E) prompting remote terminals which have not yet initiated their attempt to communicate with said central location to establish new respective times within the varied first call-in window for initiating their attempt to communicate with said central location;

(F) repeating steps (C)–(E) to establish a final minimum length of the first call-in window at which the number of said remote terminals which simultaneously communicate with said central location is approximately equal to the capacity of said central location;

(G) maintaining the final length of the first call-in window set in step (F) until each remote terminal in said population of remote terminals has initiated its attempt to communicate with said central location;

(H) prompting remote terminals which were unsuccessful in their attempt to communicate with said central location during the first call-in window to establish respective times within the second call-in window for initiating their attempt to communicate with said central location; and (I) repeating steps (C)–(G) for the second call-in window.

2. The method according to claim 1 further comprising the step of:

dividing said population into a plurality of classes of remote terminals such that only remote terminals within particular classes initiate attempts to communicate with said central location over said communication network.

3. The method according to claim 2 wherein the step of dividing said population into a plurality of classes comprises dividing said population into a plurality of classes in accordance with a geographic location of respective remote terminals.

4. The method according to claim 3 wherein the population is divided in accordance with a time zone in which respective remote terminals are disposed.

5. The method according to claim 1 wherein information is transmitted from said remote terminals to said central location.

6. The method according to claim 1 wherein information is transmitted from said central location to said remote terminals.

7. The method according to claim 1 wherein said communication network comprises a public switched telephone network.

8. The method according to claim 1, wherein the step (B) of establishing respective times within the first call-in window comprises:
establishing respective times in accordance with the formula $$(\text{RAND} * \text{Initial Window End Time})/(\text{Initial Window End Time})$$

wherein the Initial Window End Time is determined by the initial length of the first call-in window and RAND is a first random number between zero and the Initial Window End Time.

9. The method according to claim 8, wherein RAND is a pseudo-random number.

10. The method according to claim 8, wherein the step (E) of establishing new respective times within the decreased first call-in window comprises:
establishing new respective times in accordance with the formula $$(\text{RAND} * \text{Decreased Window End Time})/(\text{Initial Window End Time})$$

wherein the Initial Window End Time is determined by the initial length of the first call-in window, the Decreased Window End Time is determined by the length of the decreased first call-in window, and RAND is a second random number between zero and the Initial Window End Time.

11. The method according to claim 10, wherein the first random number is different than the second random number.

12. A method for transmitting information over a communication network between a population of remote terminals and a central location having a capacity of simultaneously communicating with a predetermined number of remote terminals in said population, the method comprising the steps of:

(A) fixing a sequence of at least tow call-in windows each having an initial maximum length, a first call-in window defining a time period during which each remote terminal in said population of remote terminals will initiate a single attempt to communicate with said central location over said communication network and a second call-in window defining a time period during which remote terminals which were unsuccessful in their attempt to communicate with said central location during the first call-in window will initiate another single attempt to communicate with said central location over said communication network;

(B) prompting said remote terminals to establish respective times within the first call-in window at which each of said remote terminals in said population of remote terminals will initiate its attempt to communicate with said central location;

(C) monitoring a number of said remote terminals which simultaneously communicate with said central location to transmit information therebetween during the first call-in window;

(D) varying the length of the first call-in window if the number of remote terminals which simultaneously communicate with said central location is less than the capacity of said central location, wherein the length of the first call-in period is varied so as to be decreased, but not increased;

(E) prompting remote terminals which have not yet initiated their attempt to communicate with said central location to establish new respective times within the varied first call-in window for initiating their attempt to communicate with said central location;

(F) repeating steps (C)–(E) to establish a final minimum length of the first call-in window at which the number of said remote terminals which simultaneously communicate with said central location is approximately equal to the capacity of said central location;

(G) maintaining the final length of the first call-in window set in step (F) until each remote terminal in said population of remote terminals has initiated its attempt to communicate with said central location;

(H) setting a retry flag in remote terminals which initiate unsuccessful attempts to transfer information to said central location; and (I) repeating steps (A)–(G) during the second call-in window for those remote terminals whose retry flag is set.

13. Apparatus for controlling a transmission of information over a communication network between a population of remote terminals and a central location having a capacity of simultaneously communicating with a predetermined number of remote terminals in said population, said apparatus comprising:
means for fixing a sequence of at least two call-in windows each having an initial maximum length, a first call-in window defining a time period during which each remote terminal in said population of remote terminals will initiate a single attempt to communicate with said central location over said communication network and a second call-in window defining a time period during which remote terminals which were unsuccessful in their attempt to communicate with said central location during the first call-in window will initiate another single attempt to communicate with said central location over said communication network;
means responsive to said means for fixing for prompting said remote terminals to establish respective times within the first call-in window at which each of said remote terminals in said population of remote terminals will initiate its attempt to communicate with said central location;
monitoring means for monitoring a number of remote terminals which simultaneously communicate with said central location to transmit information therebetween during the first call-in window;
means responsive to said monitoring means for discretely varying the length of the first call-in window until the number of remote terminals which simultaneously communicate with said central location is approximately equal to the capacity of said central location, said varying means varying the length of the first call-in period so as to be decreased, but not increased;

means responsive to said varying means for prompting remote terminals which have not yet initiated their attempt to communicate with said central location to establish new respective times within said discrete time periods at which said remote terminals will initiate their attempts to communicate with said central location.

14. Apparatus for transferring information over a communication network to a central location, said apparatus comprising:

receiving means for receiving instructions from said central location including instructions for initiating attempts to transfer information to said central location in accordance with a sequence comprising at least two call-in windows;

means responsive to instructions from said central location for establishing a time within a first call-in window at which said apparatus will initiate an attempt to communicate with said central location;

means for attempting to communicate with said central location at the time within the first call-in window;

means for transmitting the information over said communication network if said apparatus successfully communicates with said central location;

means for setting a retry flag if said apparatus is unsuccessful in the attempt to communicate with said central location;

means responsive to instructions from said central location for establishing a new time within the first call-in window at which said apparatus will initiate an attempt to communicate with said central location if said apparatus has not attempted to initiate communication with said central location and an end time of the first call-in window is changed; and means responsive to instructions from said central location for establishing a time within a second call-in window at which said apparatus will initiate an attempt to communicate with said central location if said retry flag is set.

15. A method of transferring information over a communication network from a remote apparatus to a central location, the method comprising the steps of:

receiving instructions from said central location including instructions for initiating attempts to transfer information to said central location in accordance with a sequence comprising at least two call-in windows;

establishing a time within a first call-in window at which said apparatus will initiate an attempt to communicate with said central location in accordance with instructions from said central location;

attempting to communicate with said central location at the time within the first call-in window;

transmitting the information over said communication network if said apparatus successfully communicates with said central location;

setting a retry flag if said apparatus is unsuccessful in the attempt to communicate with said central location;

establishing a new time within the first call-in window at which said apparatus will initiate an attempt to communicate with said central location in response to instructions from said central location if said apparatus has not attempted to initiate communication with said central location and an end time of the first call-in window is changed; and establishing a time within a second call-in window at which said apparatus will initiate an attempt to communicate with said central location in accordance with instructions from said central location if said retry flag is set.

* * * * *